Figure 1:
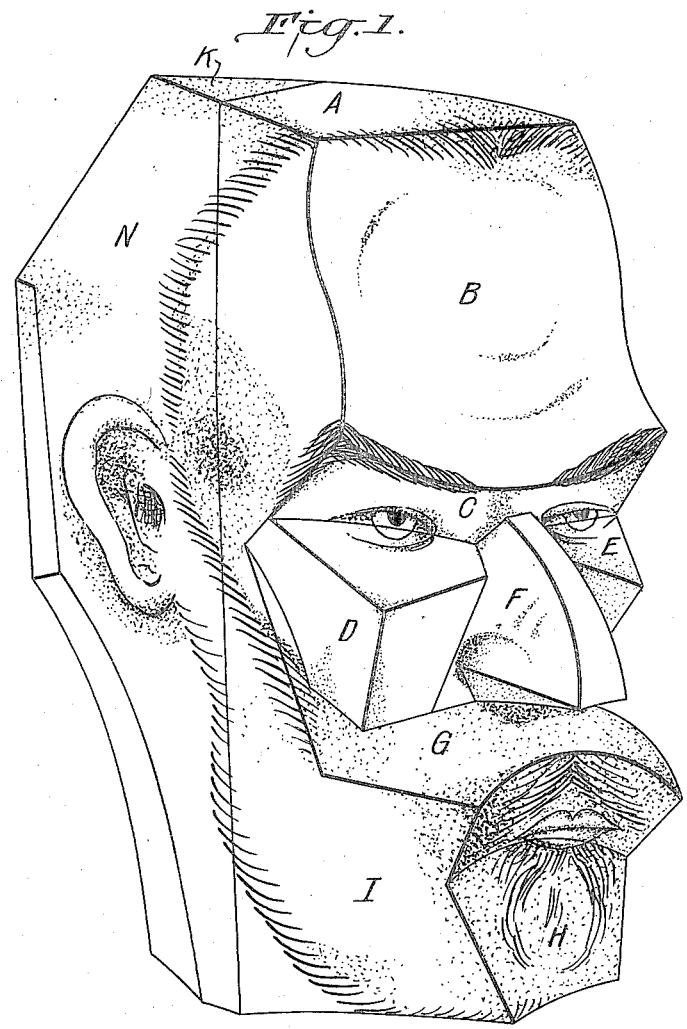

Dec. 8, 1936.  A. SOFO  2,063,561
REPRODUCING FIGURES
Filed Nov. 19, 1935  3 Sheets-Sheet 1

Inventor
ARTURO SOFO
By Karl Fruning
his Attorney

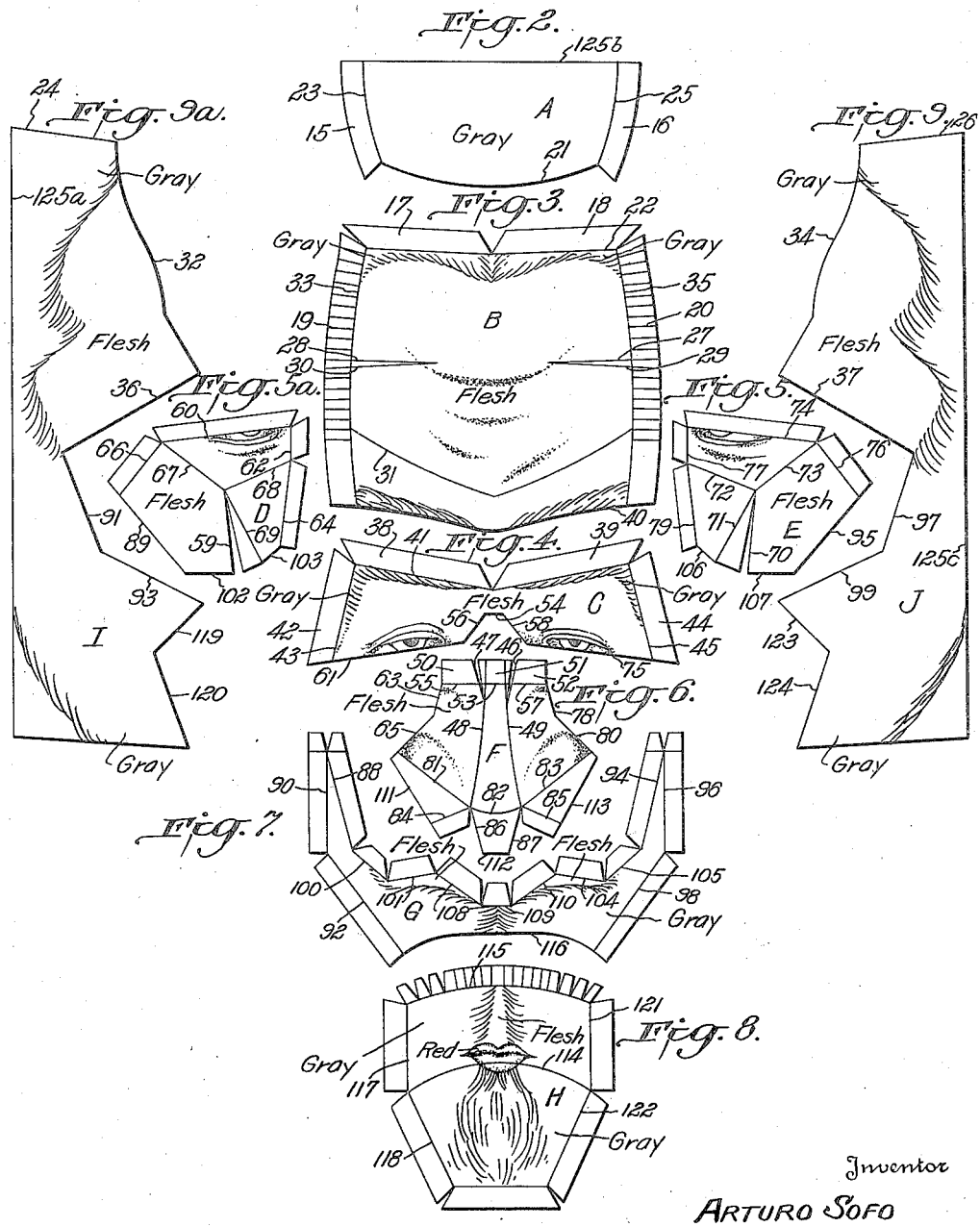

Dec. 8, 1936.  A. SOFO  2,063,561
REPRODUCING FIGURES
Filed Nov. 19, 1935  3 Sheets-Sheet 3
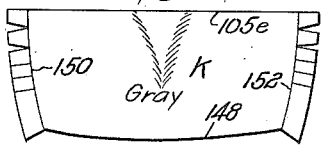
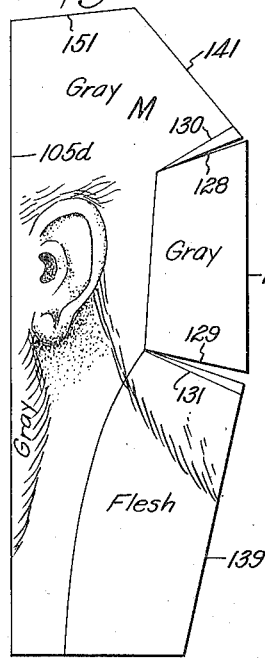
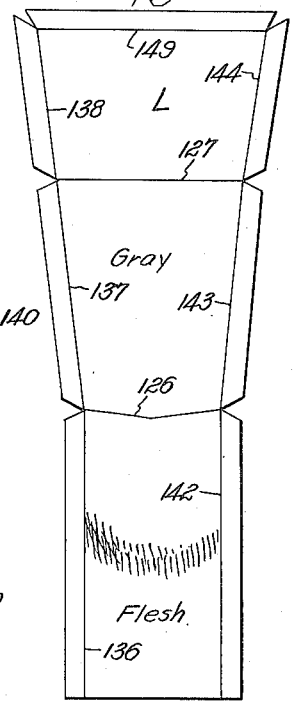
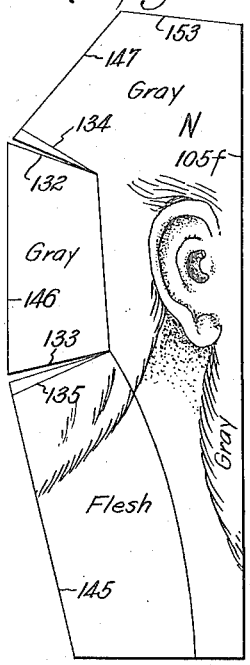
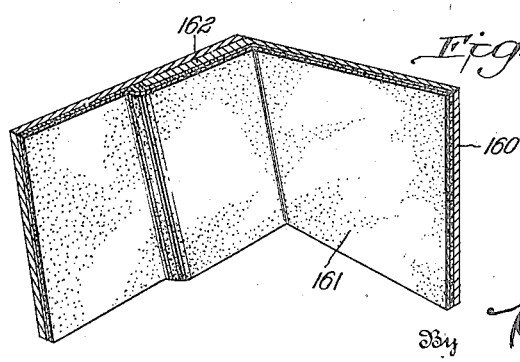
Inventor
ARTURO SOFO Patented Dec. 8, 1936

2,063,561

UNITED STATES PATENT OFFICE 2,063,561

REPRODUCING FIGURE

Arturo Sofo, New York, N. Y., assignor to Harrison B. Child, Medfield, Mass.

Application November 19, 1935, Serial No. 50,585

4 Claims. (Cl. 41—25)

The invention relates particularly to making simulations of figures such as statuary and the like. The subject to be reproduced may be of most any suitable character and the materials employed may be of any suitable character. In order to clearly point out how to carry out the invention it may be described in connection with reproducing the sculptured head of a human being.

There is a school of art which produces its effects largely if not wholly by means of flat surfaces meeting in direct lines. The present invention is especially adapted to reproducing articles so made. To this end the head of an individual may be viewed as made up of a plurality of flat surfaces and a piece of statuary may be carved or molded to represent a head but having only flat surfaces joined at direct lines. The surfaces may be inclined and some may project inward while others project outward. When the main form is produced it may if desired be suitably colored in its various portions to simulate the hair and the flesh in various tints. Each of the planes which go to make up the figure may be reproduced in any suitable way. This may be done by some such ways as actually measuring and drawing the outlines or by rubbing or the like. When the total number of planes have been reproduced means may be provided for fastening them together in the proper order.

Preferably the material of which the planes are made will be light and possibly flexible. In order to cause the figure made from the assemblage of the planes to retain its shape and stand up as a simulation of the original piece of statuary the inner surface of the assemblage may be coated with some such material as varnish, shellac or plaster or a plurality or a sufficient number of such coats may be applied to give the required rigidity to the device to make it retain its shape and position.

If it is desired to have the surface coloring of the original model reproduced and appear on the final reproduction this may be accomplished by coloring each individual separate plane to correspond with the corresponding portion of the original piece of statuary. Thus when the planes are assembled they will give the assembled color effect of the original.

In the accompanying drawings one embodiment of the invention is shown. Figure 1 is a perspective view of a head of a man which has been reduced to plane surfaces. Figs. 2 to 12a are plan views of the various plane elements which may be assembled to reproduce the statuary of Fig. 1. Fig. 13 is a fragmentary perspective section of a portion of the completed reproduction showing the reinforcing or stiffening material in place.

In order to properly reproduce it the figure or statuary of Fig. 1 may be divided into a plurality of planes marked from A to N inclusive. Each of these planes is then reproduced. In Fig. 2 for instance is shown the plane A which makes up the forward part of the crown of the head. B shown in Fig. 3 makes up the forehead. C shown in Fig. 4 makes up the brow. D shown in Fig. 5a makes up one cheek. E shown in Fig. 5 makes up the other cheek. F shown in Fig. 6 makes up the nose. G shown in Fig. 7 makes up a portion of the face mainly between the lips and the nose. H shown in Fig. 8 makes up the chin. I shown in Fig. 9a makes up the forward part of one side of the head. J shown in Fig. 9 makes up the forward part of the other side of the head. K shown in Fig. 10 makes up the rear of the top of the head. L shown in Fig. 11 makes up the center rear of the head. M shown in Fig. 12a makes up the rear of the left side of the head, and N shown in Fig. 12 makes up the rear of the right side of the head.

In order to limit somewhat the number of separate pieces employed several adjoining planes may be associated together in a single piece and provided with folding lines so that a single piece may be folded into a plurality of adjacent planes. In some instances portions may be cut out of the individual pieces to facilitate this folding and portions may overlap and be fastened to other portions. Some of the pieces on some of their edges may be provided with extensions or flaps for the application of adhesive to connect them properly with adjoining pieces.

The portion A Fig. 2 representing the forward part of the crown of the head may be provided with projections or flaps 15 and 16. The portion B Fig. 3 may be provided with projections or flaps 17, 18, 19 and 20. The flaps 17 and 18 are divided by an intermediate cut out portion. The flaps 17 and 18 may be slightly bent and covered by adhesive so as to underlie the portion A in such a way that the borderline 21 of piece A comes into contact with the borderline 22 of piece B and is held in place by the adhesive. Likewise the flap 15 of piece A will underlie and be fastened to the piece I Fig. 9a in such a way as to bring the line 23 of piece A in register with the line 24 of piece I. In the same way the flap 16 will hold the line 25 of piece A in register with the line 26 of piece J Fig. 9. In order to give a somewhat bulging effect to the forehead the piece B may be cut along the lines 27 and 28 and the line 27 brought into register with the line 29 while the line 28 is brought into register with the line 30 and fastened in that position by adhesive on the intermediate material. The piece B may be bent or folded along the line 31 to form the inwardly extending upper portion of the brow. The flap 19 may be caused to underlie the line 32 of piece I so as to bring the line 32 in register with the line 33 of piece B. Likewise adhesive may be applied to the flap 20 of piece B to hold the line 34 of piece J in register with the line 35 of piece B. At the same time the lower portion of the flap 19, below the line 31, will bring the lower portion of the line 33, below the line 31, in register with the upper portion of the line 36 of piece I and the lower portion of the flap 20, below the line 31, will bring the lower portion of the line 35, below the line 31, in register with the upper portion of the line 37 of piece J. The flaps 38 and 39 of piece C Fig. 4 will be brought under piece B to bring the line 40 of piece B in register with the line 41 of piece C. Piece C will extend inward in the figure so that its flap 42 will rest under the piece I and bring the line 43 in register with the lower portion of the line 36. At the same time flap 44 will be attached to the underside of the piece J so as to bring the line 45 in register with the lower portion of the line 37. The piece F Fig. 6 may then be cut on the lines 46 and 47. The piece may then be folded on the lines 48 and 49 so as to bring together the flaps 50, 51 and 52 so that they may be attached to the underside of the piece C in such a way that the line 53 registers with the line 54, the line 55 registers with the line 56 and the line 57 registers with the line 58. The piece D Fig. 5a may then be cut on the line 59 and folded on the lines 67 and 68 and the line 59 held in register with the line 69 by means of adhesive on the intermediate flap. The piece D then may be inserted between the pieces C, F and I and held by its flaps in such a way that the line 60 of piece D is held in register with the line 61 of piece C. The line 62 is held in register with the line 63 and line 64 is held in register with the line 65 of the piece F while the line 66 of the piece D is held in register with the lower portion of the line 36 of piece I. In like manner the piece E Fig. 5 having been cut on the line 70 is held in register with line 71 by adhesive on the intervening portion and the piece E is then folded on the lines 71, 72 and 73 and held by its flaps with the line 74 in register with the line 75 of piece C, the line 76 in register with the lower portion of the line 37 of piece J, the line 77 in register with the line 78 of piece F and the line 79 in register with the line 80 of piece F. The piece F has been folded along the lines 81, 82 and 83 and by means of the flaps the lines 84 and 85 are held in register with the lines 86 and 87 respectively. The piece G Fig. 7 is then applied and held by its flaps so that the line 88 registers with the line 89 of piece D. The line 90 registers with the line 91 of piece I, the line 92 registers with the line 93, the line 94 registers with the line 95 of piece E, the line 96 registers with the line 97 of piece J and the line 98 registers with the line 99 of piece J. The lines 100 and 101 register respectively with the lines 102 and 103 of piece D. The lines 104 and 105 register respectively with the lines 106 and 107 of piece E while the lines 108, 109, and 110 register respectively with the lines 111, 112 and 113 of piece F. The piece H Fig. 8 is folded forwardly along the line 114 and by its flaps the line 115 is held in register with the line 116 of piece G. Lines 117 and 118 are held by the flaps respectively in register with the lines 119 and 120 of piece I while the lines 121 and 122 are held in registry respectively with the lines 123 and 124 of piece J. This completes the front half of the figure being that portion in front of line 125 of Fig. 1, line 125 being made up respectively of lines 125a of piece I, 125b of piece A and 125c of piece J. The interior of this structure may then be coated with any suitable stiffening materials such as varnish, shellac or cement, liquid plaster of Paris or the like. In doing this it is preferable that a small border along the line 125 be left free to receive a means for fastening the front group unit to the rear group unit the construction of which will now be described.

The pieces illustrated in Figs. 10, 11, 12 and 12a are assembled to form the rear half of the figure being that portion behind the line 125 in Fig. 1. The piece L Fig. 11 forming the center of the back of the head may be folded on the lines 126 and 127. The piece M Fig. 12a may be cut on the lines 128 and 129 and by means of adhesive on the flaps the line 128 may be held in register with the line 130 while the line 129 is brought into register with the line 131. The piece N Fig. 12 may be cut along the lines 132 and 133 and by means of the flaps the line 132 may be held in register with the line 134 and the line 133 will be held in registry with the line 135. The flaps on the piece L may then be employed to hold the lines 136, 137 and 138 in register respectively with the lines 139, 140 and 141 of piece M. In a similar manner the lines 142, 143 and 144 may be held by the flaps in registry with the lines 145, 146 and 147 respectively of the piece N. The piece K Fig. 10 may be inserted against the flap of the piece L so as to bring the line 148 of piece K in registry with the line 149 of piece L. The flaps of piece K may hold the line 150 in registry with the line 151 of the piece M and the line 152 in registry with the line 153 of the piece N. This completes the formation of the rear half of the figure and it may then be likewise treated with stiffening material such as varnish, shellac etc. preferably the edge being left free. The line 105 in this section is made up of the lines 105d of the piece M, 105e of the piece K and 105f of the piece N.

In this condition a suitable fastening device may be employed to fasten together the two halves of the figure. For instance a suitable strip of adhesive material may be applied along the line 105 so as to overlap and hold together both pieces. Preferably this adhesive layer will be placed on the inside of the figure so as not to mar its surface appearance. Obviously this connecting means may be applied before the stiffening material is applied to the various sections in which event the stiffening material may be applied to the entire device on the interior through the open neck. If stiffening material has been applied to the sections separtely before they are joined preferably additional stiffening material will be applied after they are joined to insure giving to the material of the reproduced figure sufficient stiffness at all points including the joint along the line 105 to make it stand rigidly and as a true reproduction of the original figure. Indeed if desired or found convenient stiffening material may be applied separately to the individual pieces or to any number of them when or as they are connected together.

As illustrated in Fig. 13 the completed reproduction may consist of an outer layer 160 made up of material of which the pieces A to N are made within which is a coating 161 of suitable stiffening material. It will be noted that the stiffening material may be made up of several layers and if desired the layers may be of different materials. The stiffening material covers not only the main surface of the pieces A to N but will also cover the connecting flaps 162 and since it is a unitary layer passing over the flaps it may aid in holding the pieces together as well as in stiffening and holding in shape the completed reproduction.

The surface of the original figure may be suitably colored as indicated diagrammatically in Figure 1. The individual pieces A to N may be suitably colored to correspond exactly with the corresponding portions of Fig. 1. Such coloring is diagrammatically indicated in the drawings. By such an arrangement the completed reproduction will simulate the original not only in form but also in color. If desired the original figure may be left uncolored and only the individual pieces colored or the original figure may be colored and the individual pieces left uncolored so that the completed reproduction as a whole may be colored or the original figure may be left uncolored and the original pieces may be left uncolored thus producing an uncolored reproduction which if desired may be suitably colored to meet the wishes of the operator.

The material of which the pieces A to N is made may vary within wide limits. The pieces may be made of ordinary news print in which event the pieces A to N may be printed in a newspaper and accompanied by suitable instructions for cutting, assembling and stiffening. Such a print may be accompanied by a print similar to Fig. 1 so as to indicate the figure to be reproduced and serve possibly as an aid to assembling the parts. Paper of stiffer or more expensive character may be employed or fabrics such as canvas, buckram or the like may be employed and the internal stiffening coating may be of any character suitable for the material to which it is applied.

In preparing such devices adhesive may be applied to or printed on the various flaps or the adhesive may be supplied separately and procured independently. Preferably a good efficient effective adhesive will be used such as waterproof glue or other glues having glucose or casein base.

The figures to be reproduced may include ordinary statuary, either classical or already in existence or original works. Marionettes may be reproduced and the invention may be employed for advertising to enable persons to reproduce figures used as trade marks and for other advertising purposes.

Variations in details in carrying out the invention may be made within wide limits.

I claim as my invention:

1. The process of reproducing figures comprising reducing the figures to a plurality of substantially flat adjoining surfaces, coloring the surfaces to produce a desired effect, producing in some such material as paper a reproduction of each surface but provided with extensions for suitably engaging and holding adjoining surface reproductions, coloring the surface reproductions to simulate the original surfaces, attaching together a plurality of surface reproductions so as to expose the colored sides and to form units simulating portions of the figure, attaching together the units to simulate the entire figure, and coating the interior of the simulation with a stiffening and reinforcing material so as to give the whole sufficient rigidity to maintain its shape simulating the figure.

2. The process of reproducing figures comprising reducing the figures to a plurality of substantially flat adjoining surfaces, producing in some such material as paper a reproduction of each surface, attaching together a plurality of surface reproductions so as to form units simulating portions of the figure, attaching together the units to simulate the entire figure, and coating the interior of the simulation with a stiffening material so as to give the whole sufficient rigidity to maintain its shape simulating the figure.

3. The process of reproducing figures comprising reducing the figures to a plurality of substantially flat adjoining surfaces, producing in some such material as paper a reproduction of each surface but provided with extensions for suitably engaging and holding adjoining surface reproductions, attaching together a plurality of surface reproductions to form units simulating portions of the figure, attaching together the units to simulate the entire figure, and coating the interior of the simulation with a stiffening material so as to give the whole sufficient rigidity to maintain its shape simulating the figure.

4. The process of reproducing figures comprising reducing the figures to a plurality of substantially flat adjoining surfaces, producing in some such material as paper a reproduction of each surface, attaching together a plurality of surface reproductions so as to simulate the entire figure, and coating the interior of the simulation with a stiffening and reinforcing material so as to give the whole sufficient rigidity to maintain its shape simulating the figure.

ARTURO SOFO.